United States Patent [19]

Seidel

[11] 3,798,573

[45] Mar. 19, 1974

[54] PHASE MODULATOR USING A FREQUENCY MIXING PROCESS

[75] Inventor: Harold Seidel, Warren, N.J.

[73] Assignee: Bell Telephone Laboratories, Incorporated, Murray Hill, N.J.

[22] Filed: Mar. 16, 1973

[21] Appl. No.: 342,174

[52] U.S. Cl. .......... 332/16 R, 325/445, 332/23 A, 332/30 V

[51] Int. Cl. .......... H03c 3/22

[58] Field of Search .... 332/16 R, 16 T, 23 R, 23 A, 332/24, 29 R, 30 R, 30 V; 325/445, 446

[56] References Cited

UNITED STATES PATENTS 2,566,876 9/1951 Dome .......... 332/23 A
3,123,769 3/1964 Meyer .......... 332/16 X
3,437,958 4/1969 Shaw et al. .......... 332/23 X
3,479,615 11/1969 Garver .......... 332/16 X

*Primary Examiner*—Alfred L. Brody
*Attorney, Agent, or Firm*—S. Sherman

[57] ABSTRACT

This application discloses a phase modulator comprising a plurality of phase shifters whose output are coupled to a frequency mixer. Carrier signals at different frequencies are applied to the phase shifters along with modulating signals derived from a common source. The resulting phase modulation impressed upon the output signal extracted from the mixer is related to the phases of the input signals to the mixer in the same way as the frequency of the output signal is related to the frequencies of the several input signals. This technique is used to synthesize specific phase functions. In particular, an arcsine function is generated using two varactor diode phase shifters.

3 Claims, 5 Drawing Figures

PHASE MODULATOR USING A FREQUENCY MIXING PROCESS

This application relates to phase modulators.

BACKGROUND OF THE INVENTION

In the copending application by D. C. Cox, Ser. No. 222,243, filed Jan. 31, 1972, and assigned to applicant's assignee, a linear amplifier using available nonlinear amplifying devices is described. One of the components of this amplifier is a phase modulator which produces a phase shift that is proportional to the arcsine of the modulating voltage. Such a function, it will be noted, has odd symmetry about the origin as well as positive and negative derivative discontinuities. As such it is a relatively difficult function to simulate.

In seeking solutions to this problem, it is of interest to note that a varactor diode manifests a similar capacitive discontinuity. The problem in using a varactor, however, is that the phase change that can be realized is one sided. That is, only a discontinuous phase delay can be realized. There is no apparent way of realizing a discontinuous phase advance.

It is, accordingly, a specific object of the present invention to synthesize an arcsine phase function using varactor diodes.

More generally, it is a broad object of the present invention to synthesize a variety of phase functions.

SUMMARY OF THE INVENTION

The present invention is based upon the realization that the phase of a signal produced by a frequency mixing process is related to the phases of the input signals to the mixer in the same way as the frequency of said signal is related to the frequencies of the input signals. Thus, if the output frequency is given by $$\pm n\omega_1 \pm m\omega_2 \ldots \pm p\omega_z , \qquad (1)$$

the corresponding phase is similarly given by $$\pm n\theta_1 \pm m\theta_2 \ldots \pm p\theta_z , \qquad (2)$$

where $n$, $m$, $p$ and $z$ are any integers including zero.

Applying this fact, a phase modulator, in accordance with one embodiment of the present invention, comprises two phase shifters to which there are applied carrier signals at frequencies $\omega_1$ and $\omega_2$, respectively, and modulating signals $v$ and $-v$. The resulting phase modulated signals $v_1 = V_1 \sin [\omega_1 t+\theta_1(t)]$ and $v_2 = V_2 \sin [\omega_2 t+\theta_2(t)]$ are then coupled to a frequency mixer from which the difference frequency signal $\omega_2 - \omega_1$ is extracted. The corresponding phase of the output signal is then given by $$\theta_3(t) = \theta_2(t) - \theta_1(t) . \qquad (3)$$

Using varactor diodes in the individual phase shifters results in an output phase function which resembles an arcsine function to the extent that it possesses two vital features: (1) the resulting phase function has odd symmetry about the origin, including a linear central portion about the inflection point; and (2) the function possesses positive and negative discontinuities.

More generally, a plurality of individual phase shifters can be employed and any arbitrary phase function generated within the limits given by equation (2).

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

Referring to the drawings, FIG. 1 shows a first embodiment of a phase modulator, in accordance with the invention, comprising first and second phase shifters 10 and 11, and a frequency mixer 12. In this illustrative embodiment, and for reasons which will become apparent hereinbelow, each of the phase shifters includes a varactor diode. In particular, phase shifter 10 comprises a circulator 13 and a varactor diode 14. Phase shifter 11 similarly includes a circulator 15 and a varactor diode 16. In both, the varactor is connected to circulator port 2. Port 1 constitutes

Figure 1:
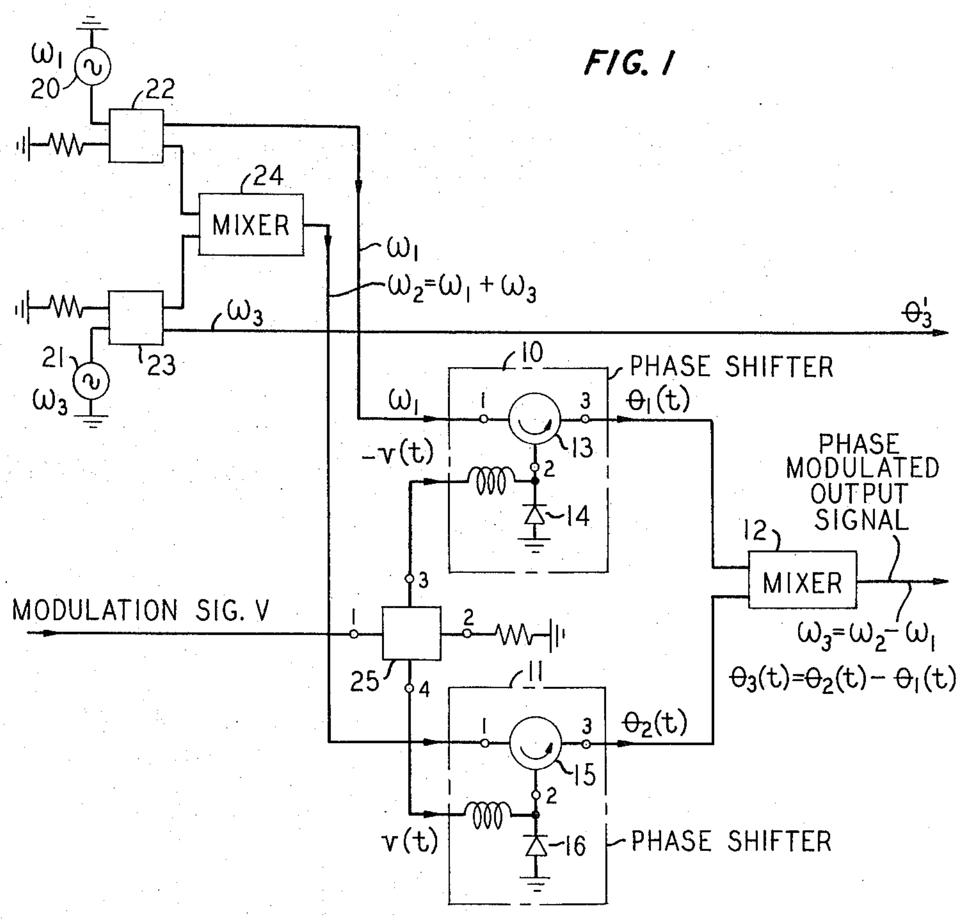
FIG. 1 shows a first embodiment of a phase modulator in accordance with the invention.

The output signals at port 3 of phase shifters 10 and 11 are coupled to frequency mixer 12 from which a selected modulation product signal is extracted. The latter constitutes the desired phase modulated output signal.

To each of the phase shifters there is applied an input carrier signal and a modulating signal. The carrier signal applied to circulator port 1 of phase shaft 10 is at a first frequency $\omega_1$. The carrier signal applied to circulator port 1 of phase shifter 11 is at a second, higher frequency $\omega_2$, where $\omega_2 - \omega_1$ is equal to the desired output carrier frequency $\omega_3$. In the illustrative embodiment of FIG. 1, the carrier signals are obtained from two signal sources 20 and 21, The former, at frequency $\omega_1$, is coupled to phase shifter 10 by means of a signal divider 22, which also couples a portion of the signal to a frequency mixer 24. In like manner, a portion of the signal from source 21 is also coupled to mixer 24 by means of a signal divider 23. These two signal portions produce the sum signal $\omega_2 = \omega_1 + \omega_3$, which is extracted from the mixer and coupled to phase shifter 11.

The intelligence bearing modulating signal V, derived from a signal source not shown, is divided into two, 180 degree out-of-phase components $-v(t)$ and $v(t)$ by means of a signal divider 25, such as a magic-T coupler, or a hybrid transformer. One component, $-v(t)$, is applied across varactor diode 14. The other component, $v(t)$, is applied across varactor diode 16.

Figure 2:
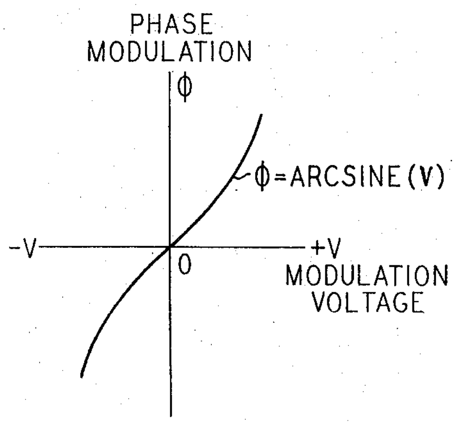
FIG. 2, included for purposes of explanation, shows an arcsine function.

The embodiment of FIG. 1 is specifically directed to simulating an arcsine phase function as required in the above-identified Cox application. This function is shown graphically in FIG. 2. As will be noted, the arcsine function exhibits odd symmetry about the origin, and has a positive and negative discontinuity.

Figure 3:
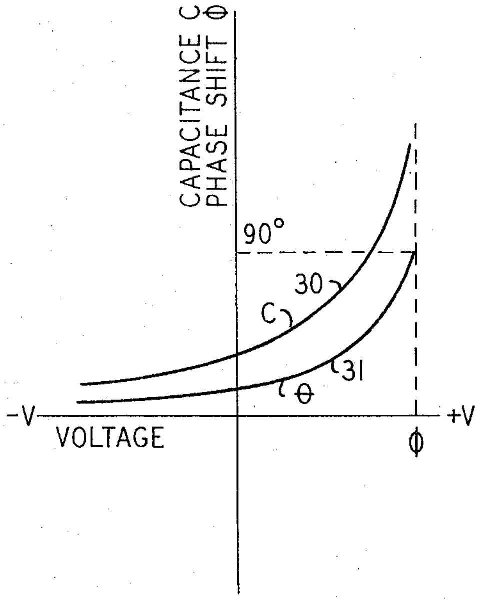
FIG. 3 shows the capacitance-voltage characteristic of a varactor diode and the resulting phase shift produced in the phase shifts of FIG. 1.

The capacitance function, $$C = 1/\sqrt{\phi - v} \quad (4)$$

of a varactor diode, as illustrated by curve 30 in FIG. 3, is also seen to include a discontinuity. The capacitance approaches zero for large negative values of applied voltage, and approaches infinity at $v = \phi$. The corresponding phase shift $\theta$ produced by the varactor diode is given by $$\theta = \arctan \omega C/2 \quad (5)$$

and is shown by curve 31. The latter goes from zero degrees for large negative voltages, to 90° at $v = \phi$.

Figure 4:
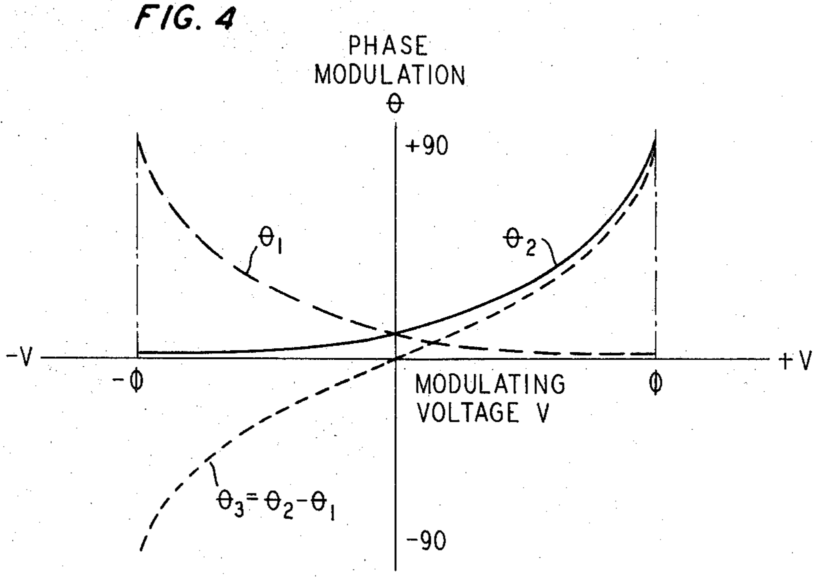
FIG. 4 shows the manner in which the phase shifters of FIG. 1 combine to produce an arcsine function.

While curve 31 exhibits a positive discontinuity, it does not exhibit the desired odd symmetry about the origin, nor does it have the negative discontinuity of the arcsine function. This is obtained, in accordance with the present invention, by the inclusion of a second varactor phase shifter, which is modulated out of phase with the first, and a mixer which subtracts the second phase shift from the first. In particular, during positive excursions of the modulating signal, V, a positive voltage is applied to one of the varactor diodes 16 in FIG. 1, producing a relatively large phase shift, whereas a negative voltage is applied to the other varactor diode 14, producing a relatively small phase shift. Similarly, during negative excursion of the modulating signal, a negative voltage is applied to varactor diode 16, producing a small phase shift, whereas a positive voltage is applied to varactor diode 14, producing a large phase shift. The resulting phase curves $\theta_1$ and $\theta_2$ for phase shifters 10 and 11 are shown in FIG. 4. The net phase modulation $\theta_3$ impressed upon the difference frequency output signal is, from equation (2), the difference of these two curves. The latter, it will be noted, has the general negative symmetry shape and the discontinuities of the arcsine function.

Having established the general shape of the phase function, the scale of the curve is fixed by selecting varactors having the desired capacitance. For example, one way of producing a phase modulation curve $\theta_3$ that has odd symmetry about the origin, is to make the susceptance of varactor 14 at frequency $\omega_1$ equal to the susceptance of varactor 16 at frequency $\omega_2$ over the operating range of modulating voltages. Alternatively, some form of modulation waveform predistortion can be employed. Other means of tailoring the phase function include the choice of varactor bias, and the inclusion of fixed capacitors in series and/or shunt with the varactor. Obviously, any or all of these techniques can be employed.

Figure 5:
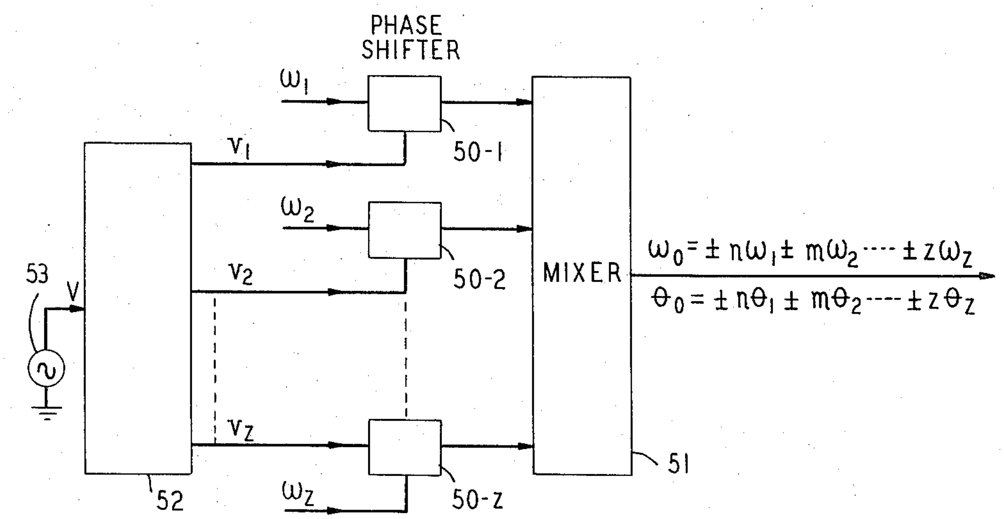
FIG. 5 shows a generalized phase function generator in accordance with the present invention. the phase shifter input port, and port 3 the output port.

In the embodiment of FIG. 1, the phase of the output signal from mixer 12 varies about the origin, advancing or retarding relative to the phase of the reference signal derived from source 21 as the arcsine of the modulation signal V. There are, however, other phase functions that can be synthesized in accordance with the present invention. FIG. 5 shows, in block diagram, a generalized phase function generator comprising a plurality of phase shifters 50-1, 50-2, . . . 50-z whose outputs are coupled to a frequency mixer 51. To each phase shifter there is applied a carrier signal at a different frequency $\omega_1, \omega_2, \ldots \omega_z$, and a modulating signal component $v_1, v_2, \ldots V_z$. The modulating signal components, derived from a common signal source 53, are coupled to the several phase shifters by means of a signal divider 52. The phase of the output signal is a function of the modulation product component selected as the output signal. In general, an output signal, at frequency $\omega_0$ given by $$\omega_0 = \pm n\omega_1 \pm m\omega_2 \ldots \pm p\omega_z, \quad (6)$$

will have a phase function given by $$\theta_0 = \pm n\theta_1 \pm m\theta_2 \ldots p\theta_z, \quad (7)$$

where $n, m, p \ldots z$ are integers including zero; and $\theta_1, \theta_2, \ldots \theta_z$ are a function of the particular phase shifters and the applied modulating signals $v_1, v_2, \ldots v_z$.

Thus, in all cases it is understood that the above described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim:

1. A phase modulator comprising:

a plurality of phase shifters, each of which is asapted to operate at a different carrier signal frequency;

means for applying a component of a common modulating signal to each of said phase shifters for varying the phase of the respective carrier signals;

means for coupling the outputs from said phase shifters to a frequency mixer;

and means for extracting an output signal from said mixer.

2. The phase modulator according to claim 1 wherein:

the frequency $\omega_0$ of said output signal is $$\omega_0 = \pm n\omega_1 \pm m\omega_2 \ldots \pm p\omega_z;$$

and wherein the phase of said output signal is $$\theta = \pm n\theta_1 \pm \theta_2 \ldots p\theta_z;$$

where $\omega_1, \omega_2 \ldots \omega_z$ are the frequencies of said carrier signals;

$\theta_1, \theta_2 \ldots \theta_z$ are the phases of the output signals from said phase shifters and $n, m, p \ldots z$ are integers including zero.

3. The phase modulator according to claim 1 wherein each of said phase shifters comprises a multiport circulator and a varactor diode;

and wherein a first port of said circulator constitutes the input port of said phase shifter;

the varactor diode is connected to a second circulator port;

and a third circulator port constitutes the output port of said phase shifter.

* * * * *